(12) United States Patent
Ballester

(10) Patent No.: US 6,283,244 B1
(45) Date of Patent: Sep. 4, 2001

(54) STEERING MECHANISM ASSEMBLY FOR AUTOMOTIVE VEHICLE

(75) Inventor: Adrián José Ballester, Buenos Aires (AR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/095,943

(22) Filed: Jun. 12, 1998

(30) Foreign Application Priority Data

Oct. 3, 1997 (AR) .............................. P970104566

(51) Int. Cl.$^7$ ...................................... B62D 3/12
(52) U.S. Cl. ............................ 180/428; 74/422
(58) Field of Search ................ 180/427, 428, 180/400; 74/422, 493, 498; 280/93.514, 93.515

(56) References Cited

U.S. PATENT DOCUMENTS

| | | | |
|---|---|---|---|
| 4,144,948 | * | 3/1979 | Sergay . |
| 4,724,714 | * | 2/1988 | Iwasaki et al. ................... 74/498 |
| 4,809,806 | * | 3/1989 | Pietrzak et al. ................. 180/428 |
| 4,815,329 | * | 3/1989 | Ansgar et al. ................... 74/422 |
| 4,939,947 | * | 7/1990 | Toyoshima et al. ............. 180/428 |
| 5,070,958 | * | 12/1991 | Goodrich, Jr. et al. .......... 180/427 |
| 5,213,174 | * | 5/1993 | Adams ............................ 180/427 |
| 5,482,132 | * | 1/1996 | Birsching ........................ 180/428 |
| 5,651,424 | * | 7/1997 | Joerg et al. ...................... 180/427 |
| 5,660,078 | * | 8/1997 | Phillips ........................... 180/428 |
| 5,735,365 | * | 4/1998 | Sako et al. ...................... 180/427 |
| 6,193,008 | * | 2/2001 | Hafermalz ....................... 180/428 |

* cited by examiner

Primary Examiner—J. J. Swann
Assistant Examiner—Christopher Bottorff
(74) Attorney, Agent, or Firm—John Kajander

(57) ABSTRACT

A manual or power-assisted steering control linkage assembly for an automotive vehicle, with the aim of facilitating the manufacture of housings for the steering control linkages and eliminating undesirable vehicle noise which results from axial stresses acting on the steering mechanism. A housing including two independent metallic tubular housing elements which are machinable, which housing elements house and provide support structure for the rack and pinion, wherewith the tubular housing elements are joined in the required angular orientation via welding or brazing at respective contoured openings cut in the walls of the tubular housing elements. The noise control is provided by automatic positioning the pinion in engagement with the rack, which by elastic organs associated with the pinion shaft, which organs continuously urge the pinion into engagement with the rack in response to the tendency of the rack to separate from such engagement. The elastic organs cooperate with a conical or cylindrical pinion.

10 Claims, 3 Drawing Sheets

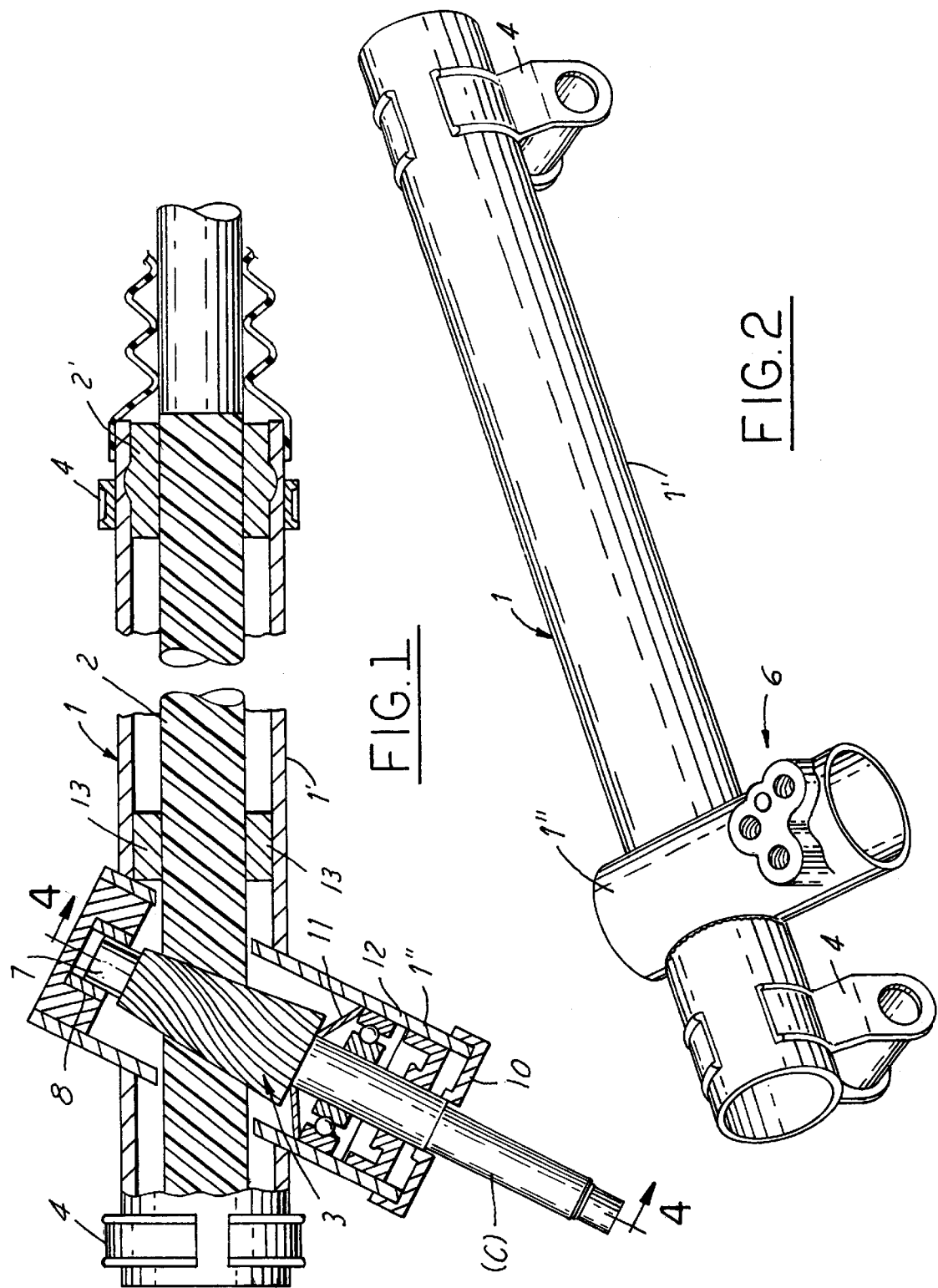

STEERING MECHANISM ASSEMBLY FOR AUTOMOTIVE VEHICLE

FIELD OF THE INVENTION

The invention relates to improvements in steering mechanism assemblies for automotive vehicles, particularly with the aim of solving problems of the mechanical design and alignment of housing elements for accommodating the various components of the steering mechanism, particularly the steering control linkage, and with the aim of improving the conditions, functioning, and engagement of the steering mechanism components, particularly those of the steering control linkage.

It is an object of the invention to provide structural improvements in housings conventionally used for steering control linkage assemblies, which improvements are aimed at simplifying the fabrication, structure, and angular alignment (skew angular alignment), of housing elements for a steering control linkage employing rack-and-pinion steering wherein rotational movement of the steering wheel is converted into reciprocable linear movement of the rack.

A further object of the invention is to improve the steering control linkage such that correct frictional contact is maintained between the interengaged dentations (those of the rack and pinion), within the established limits of tolerance, in response to axial stresses present in the articulations of the housing which tend to urge the rack into a position distant from and out of proper engagement with the pinion and back into tighter engagement, which stresses thereby result in generation of undesirable noise.

The principal end product of the invention is a steering control linkage housing of simple structure for control linkages for unassisted (manual) mechanical steering or power steering, which control linkages employ a rack and pinion, wherewith the subject housing incorporates means to improve the conditions of engagement of the rack and pinion in the face of axial stresses present in the housing, which stresses cause undesirable noise during the operation of the vehicle.

BACKGROUND OF THE INVENTION

Conventional steering control linkage housings are fabricated by casting of molten aluminum or other materials. A valve housing comprised generally of cast iron is also used in the case of power steering. The fabrication of such components is attended by various problems. Complex and precise procedures are required for assembly and alignment of a cast iron valve housing with a cast aluminum steering control linkage housing, to ensure correct skew angular positioning of the components of the steering control linkage.

One reason why it is difficult to achieve proper alignment of conventional steering control linkage housings comprised of cast material is that there are two subassemblies which must be aligned:

the rack and its housing, and the pinion, the valve system, and their housings.

The parts of the housing must be in correct skew angular alignment in order to achieve good operating characteristics of the steering system, and particularly the steering control linkage.

The alignment procedures may require different skew angular alignments depending on the particular variant of the steering system used, and necessitate the use of different casting molds for fabricating the elements of the steering control linkage housings and for adapting the power-assisted steering valve housing. For each situation, a specific skew angular alignment of the steering column shaft (pinion shaft) and the rack housing is required, in order for the steering system to function properly.

Another problem which occurs with steering systems is the undesirable noise generated by excessive frictional play between the dentation of the pinion and the dentation of the rack. Such noise is a problem in power-assisted steering systems as well as manual systems. In some cases, the vibration is absorbed by elasticity in the steering system. Otherwise it must be reduced to acceptable limits in order to avoid noise which is disagreeable to the driver and which signals improper functioning of the engaged components.

This noise problem may be due to incorrect alignment of the contoured openings in the housing, but the main cause of steering system noise is axial stresses in the joints between the housing and the chassis, which stresses give rise to a force component perpendicular to the rack bar and tending to distance the rack bar from the pinion, thereby acting counter to the means integrated in the steering assembly which are intended to regulate the relative positions of the rack and pinion.

The said axial stresses also act axially on the rack, which rack is generally mounted with releasable support means on an end bearing in the steering control linkage housing, wherewith in addition to the component of said stresses which act perpendicularly to the rack, the axial stresses give rise to an undesirable axial movement of the rack which interferes with correct interengagement of the rack and the pinion, again tending to cause the respective dentations to separate, wherewith when, in alleviation of this separation, the rack tends to return to its initial position. The result is noise, in an intensity and frequency which depend exclusively on the intensity of the abovementioned axial stresses.

The conventional means used by automobile manufacturers to address these drawbacks in steering control linkages is to use high precision molds for fabricating the housings, in order to achieve the correct alignment of the steering control linkage components. The concept is that substantial improvement in operation will result from improvements in such alignment. In addition, the known technique of providing devices which periodically regulate the position of the rack bar has been used. The general such device comprises a manually adjustable thrust bearing which is elastically urged counter to the direction of the axial stresses. These devices function well, but when over-adjusted (which is always a possibility) the result is that the rack bar is not properly re-engaged, which is detrimental to the mechanism because the re-engagement force is too great or too small, either momentarily (dynamically) or on a sustained basis.

SUMMARY OF THE INVENTION

In order to solve the problems mentioned in the foregoing, according to the invention there is proposed a housing for steering control linkages which housing has a particular structure which enables correct mutual alignment—which may be selected from a range of possible mutual alignments—of housing elements for the rack bar and the pinion (which pinion is fixed to the steering column shaft), wherewith if power-assisted steering is to be employed the housing elements may further comprise a structure for adapting to a power steering valve housing.

The inventive housing is comprised of a pair of tubular housing elements formed from steel tubes, which elements are readily machinable over their entire length. These two tubular elements are joined together in a precise skew angular arrangement as required by the particular steering control linkage.

The steel tubular elements are joined with the aid of contoured openings cut into the tube walls which openings have suitably coordinating shapes, such that when the tubular elements are superposed in the precise prescribed skew angular orientation, they can be joined together by welding or brazing at the superposed borders of the contoured openings.

The described structure of the steering control linkage housing is simple in design. It eliminates the problems of porosity which cast housings present, facilitates the mechanical alignment of the parts of the housing in coordination with the rack bar and pinion which the housing accommodates, eliminates the need for tooling in the nature of molds which would need to be re-tooled for each variation in the skew angular alignment of the housing elements, facilitates the provision of support means for support bearings for the rack bar (e.g. because the inventive housing is readily machinable), and facilitates the exact positioning of elements of the housing which are differently positioned in different versions of conventional housings. The alignment and positioning features of the inventive housing result in improved functioning of the steering mechanism.

According to the invention the inventive housing may be combined with means of automatically and accurately positioning the pinion in proper engagement with the rack, in response to displacement of the rack due to components of the abovementioned axial stresses. These automatic positioning means may be disposed in the housing element in which the pinion is housed, and may comprise an elastic organ (e.g. spring, elastic annular piece, or elastic cylindrical piece) which urges the pinion component of the steering control linkage (which pinion may be conical or cylindrical) into proper engagement with the rack when the rack becomes separated from the pinion due to stress components generated by the abovementioned axial stresses.

According to a first embodiment of the automatic positioning means, said means are mounted in the immediate neighborhood of, and in cooperation with, a conical pinion disposed at the end of the steering column shaft. The dentation of said pinion corresponds to that of the rack, and does not per se provide any type of exaggerated pre-stressing against the rack. The rack receives additional support within the proposed housing element by mounting therein of a second guide bearing (pillow bearing) which keeps the rack aligned in said housing element in order to counter the generation of undesirable movement by the action of the abovementioned axial stresses.

These means of eliminating or limiting the irregular movement of the rack bar result in substantial reduction of the undesirable noise which is common with conventional steering control linkages.

In a second embodiment of the automatic positioning means for regulating the engagement of the pinion with the rack, generally cylindrical pieces of an elastic material such as rubber which are not true cylinders but have internal openings which are eccentrically disposed, are mounted:

on the distal end of the steering column shaft (pinion shaft) which projects beyond the pinion, which pinion is a cylindrical pinion having helicoidal dentation, and radially outwardly of the support bearing which supports said shaft and is mounted in the steering control linkage housing element which is angularly disposed (in a skew angular relation) with respect to the conventional housing element which houses the rack.

These axially aligned eccentric pieces are adjusted with their eccentricities aligned, wherewith they elastically pre-stress the pinion against the rack bar.

According to a third embodiment of the automatic positioning means for regulating the engagement of the pinion with the rack, generally cylindrical rubber-elastic pieces of the type described having eccentric openings for supporting the pinion (which pinion may be conical or cylindrical) are combined with a metallic elastic organ having axial thrust, whereby the pinion is urged elastically in directions generally toward the rack.

BRIEF DESCRIPTION OF THE DRAWINGS

The invention will be better understood with the aid of preferred embodiments which will be described hereinbelow with reference to the accompanying drawings.

FIG. 1 is a partial longitudinal cross section within a plan view, of a steering control linkage which incorporates some of the improvements according to the invention, in particular improvements relating to the general type of the steering control linkage housing and relating to means of automatically positioning the components involved in the engagement of the rack and pinion in said steering control linkage;

FIG. 2 is a schematic perspective view of a preferred steering control linkage housing according to the invention;

DETAILED DESCRIPTION OF THE PREFERRED EMBODIMENTS

In FIG. 1, which is an illustration of a steering control linkage for a motor vehicle which incorporates the inventive improvements, the housing 1 is an inventive steering control linkage housing similar to known steering control linkage housings in that it is intended as a housing to accommodate various steering control linkage components including a rack 2 and a pinion 3. The pinion 3 is mounted on the steering column shaft c. The rack is supported by way of a pillow bearing (bushing bearing) 2' disposed at the distal end of the rack.

Figure 3:
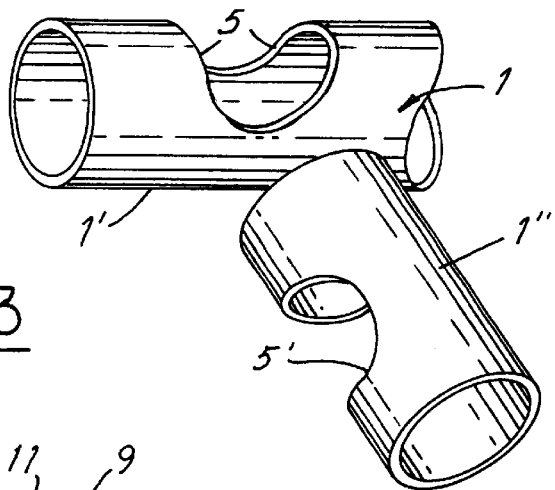
FIG. 3 is a perspective view of the tubular elements of which the inventive housing is comprised, showing the parts having contoured openings cut into them which openings are configured such that said elements can be assembled together at the appropriate skew angle.

According to the invention the housing 1 is comprised of two tubular elements (1', 1") shown in more detail in FIGS. 2 and 3. Preferably, elements (1', 1") both comprise steel tubes; but alternatively the element 1' which serves as a housing element for the rack 2 may comprise a steel tube, and the element 1″ which serves as a housing element for the pinion 3 may comprise a cast iron tube.

The tubular elements 1′ and 1″ of which the housing 1 is comprised are each easily machinable over their entire lengths. This feature allows precision machining to produce shoulders, seats, and like structures in their interiors, to facilitate the mounting of the rack 2 and pinion 3, and to facilitate the application of clamps, brackets, and other mounting hardware (4) for mounting the steering control linkage housing to the vehicle chassis.

The two tubes (1′, 1″) are joined together with the aid of contoured openings (5, 5′) cut into the respective tube walls (1′, 1″). The perimeters of these openings are complementary such that appropriate support is provided when the tubes (1′, 1″) are assembled together in a superposed crossed configuration the parameters of which are determined by the prescribed skew angular alignment of the steering control linkage components which results in the desired engagement of the rack 2 and pinion 3.

The contoured opening 5′ in element 1″ is smaller than the contoured opening 5 in element 1′, whereby when the tubes are arranged in the desired superposed position the border region around the opening 5′ provides a support for the element 1″ (FIG. 4) which facilitates the establishment of the relative angular position of the elements (1′, 1″) and subsequent welding or brazing. This manner of joining the two elements (1′, 1″) allows variations in the angular relations depending on the needs of various steering mechanisms, and avoids the difficulties in alignment when pre-cast elements are used. Moreover, the arrangement is more adaptable from vehicle model to vehicle model and vehicle manufacturer to vehicle manufacturer; in contrast to conventional housings, steering control linkage housings according to the invention can be produced for a somewhat wide range of vehicles, from the same stock pieces and with the same tooling (instead of a whole series of different casting molds).

For power-assisted steering, if the tubular element 1″ is comprised of cast iron, one may readily incorporate in it a structure 6 for mounting a valve complex, which structure 6 will have the proper configuration for good operation.

As suggested, a housing 1 thus constructed enables proper alignment of the rack bar 2 and the pinion 3, along with means of automatically positioning said rack bar 2 and pinion 3 in response to axial stresses exerted on said housing 1.

A first embodiment of the described positioning means is illustrated in FIGS. 1 and 3. The dentation of the conical pinion 3 corresponds to that of the rack 2. The pinion 3 is accommodated in the tubular element 1″ of the housing 1. The pinion shaft 7 is coaxially connected to the steering column (c) and is rotationally supported and is movable to a slight degree in the axial direction, on one side by the intermediary of a bearing 8 which closes off the end of the tubular element 11″, and on the other side by an antifriction bearing 9 mounted in the opposite end region of tubular element 11″, which end region is closed off by retainer means and a conventional end cap, collectively designated with reference numeral 10.

The support means for the conical pinion 3 according to the invention incorporates an elastic organ 11 in the form of a plate spring or elastic annular piece, which organ 11 exerts a continuous pre-stress on the conical pinion 3 in the axial direction. For this purpose, elastic organ 11 is mounted between:

the antifriction bearing 9, which is positioned in the element 1″ with the aid of a retaining ring 12, and the base of the conical pinion 3.

The prestressing exerted by elastic organ 11 tends to continuously urge the pinion 3 into engagement with the rack 2, and serves to maintain correct engagement force ("pressure") between the rack 2 and pinion 3 in the face of the influence of axial stresses which tend to produce separations and spontaneous return of the rack 2 to its normal position. This regulating effect of elastic organ 11 is in coordination with the conicity of the pinion 3.

The frictional engagement characteristics of the dentations is determined by the pre-stressing of the pinion 3 by the elastic organ 11, as a consequence of the conicity of the pinion 3. At the same time, excess engagement force between the rack 2 and pinion 3 is avoided, in that the resultant force component derived from the axial stresses, in the rack 2, is compensated. A final element of an assembly which annuls possible stresses on the rack 2 is provided by a second pillow bearing 13 which supports the rack in the neighborhood of the junction of the two tubular elements (1′, 1″); this along with the conicity of the pinion 3 contributes to the proper functioning of the steering mechanism.

Figure 4:
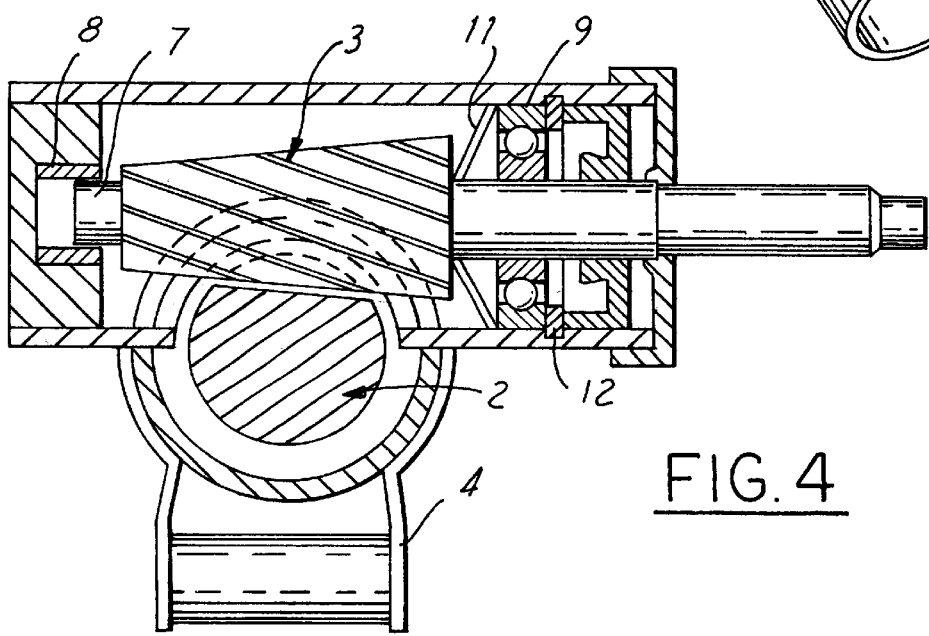
FIG. 4 is a transverse cross section of the control linkage illustrated in FIG. 1, through the line 4—4, showing details of a first exemplary embodiment of the means of automatically positioning the components involved in the engagement of a rack and a conical pinion in response to axial stresses acting on the steering mechanism of a vehicle (i.e. automatically positioning the pinion in engagement with the rack)
Figure 5:
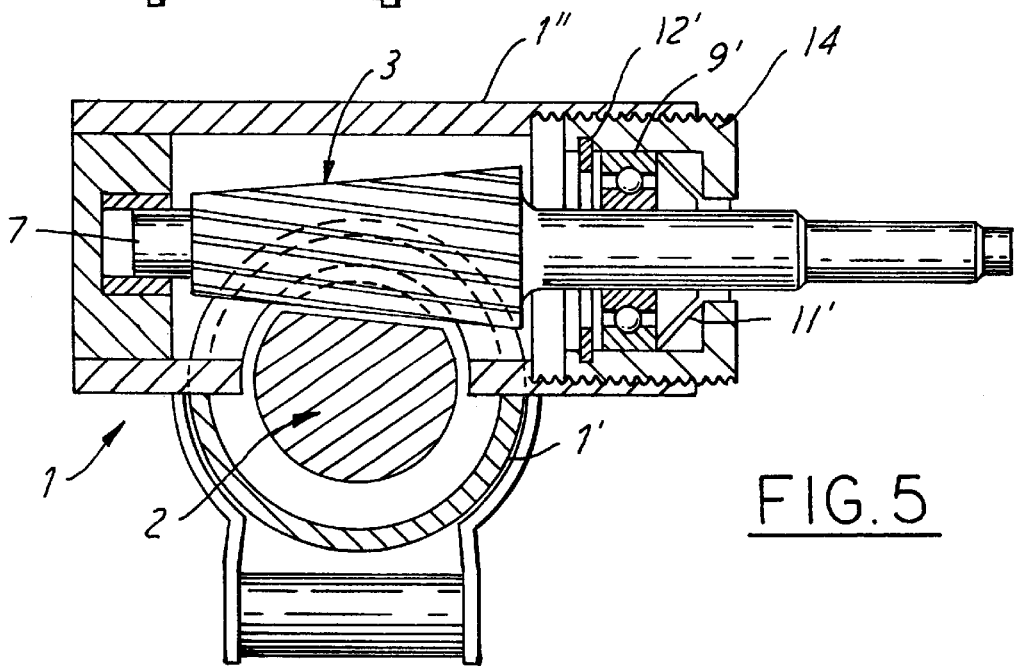
FIG. 5 illustrates a second exemplary embodiment of means of such automatic positioning.

FIG. 5 shows a variant of the embodiment of the inventive automatic pinion-positioning means shown in FIG. 4, wherein a generally annular spring 11′ acts directly on an end-disposed antifriction bearing 9′ which is mounted on the shaft 7 of the conical pinion 3. In the event the pinion suffers a slight axial movement in the tubular element 1″ of the housing 1, the movement will be limited by a retaining ring 12′ mounted in a threaded plug piece 14 threadedly engaged in the interior of the tubular element 1″, which plug piece 14 also surrounds the elastic organ 11′.

The described arrangements enable undesirable movements of the rack 2 to be resisted, thereby eliminating undesirable noise in the steering mechanism.

Figure 6:
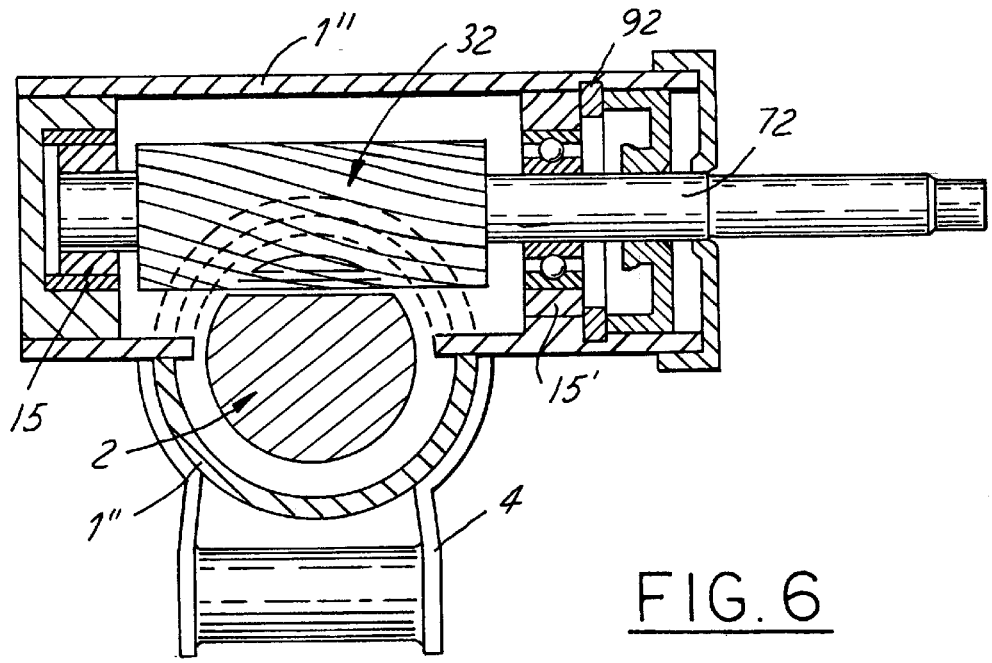
FIG. 6 illustrates a third exemplary embodiment of means of such automatic positioning, applied to the engagement of a conventional rack by a cylindrical pinion having helicoidal dentation.

According to another embodiment, illustrated in FIG. 6, the means of automatically positioning the components of the steering control linkage assembly incorporated in the described housing 1 are comprised of quasi-cylindrical pieces of elastic material (15, 15′) having eccentric openings, for supporting the shaft 7a of a cylindrical pinion 3a which engages a rack 2. The elastic piece 15 is disposed at the end region of shaft 7a which end region corresponds to the blind end of the tubular element 1′; the elastic piece 15′ is disposed around the antifriction bearing 9a, wherewith the end of tubular element 1″ which is opposite from the end which bears the first elastic piece 15 is closed off by a retaining ring and a conventional plug piece as in the preceding embodiment.

Stresses on or in the rack 2 which tend to cause the rack to move out of and into engagement with the pinion 3a are absorbed by the elastic pieces (15, 15′), after the orientations of the eccentric openings in said elastic pieces are adjusted for normal engagement of the cylindrical pinion 3a with the rack 2; this preliminary orientation of the elastic pieces elastically prestresses the shaft 7a of the pinion 3a.

Figure 7:
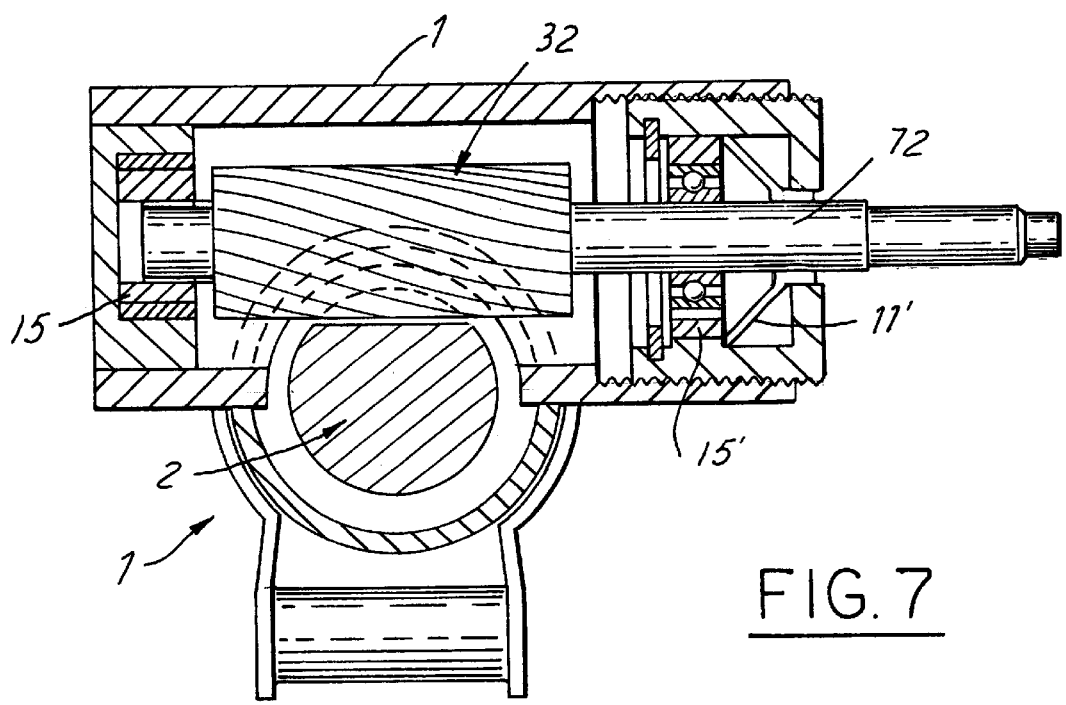
FIG. 7 illustrates a forth exemplary embodiment of means of such automatic positioning, again applied to the engagement of a rack by a cylindrical pinion having helicoidal dentation.

According to yet another embodiment (FIG. 7), the positioning means provided in the preceding embodiments have been combined, inside tubular element 11 of the housing 1. Elastic quasicylindrical pieces (15, 15′) act on the shaft 7a of the cylindrical pinion 3a, in combination with an elastic plate spring or the like 11′, whereby the influences tending to separate the rack 2 and pinion 3a are counteracted, again with the result that undesirable noises are avoided.

As may be appreciated, the described embodiments allow one to dispense with the conventional devices for regulating the engagement of the components of the steering control linkage, and to dispense with all of the appurtenances to said regulating devices. Not only are costs reduced, but more importantly the undesirable noises are eliminated.

I claim:

1. A manual or power-assisted steering control linkage assembly for automotive vehicles, including a housing having articulated mounting means at its extremities for fixing the housing to the chassis of the vehicle, the housing being acted upon by axial stresses, wherewith a complex component of said housing being formed from two tubular housing elements disposed at an angle to each other, one of the two tubular housing elements extending transversely to the vehicle chassis, and the complex housing component accommodating steering system components cooperating with a steering column shaft by a rack and pinion arrangement, said rack and pinion arrangement comprising:

a rack bar connected to wheels of a vehicle via articulated connections, the rack bar being supported and guided in sliding movement by an end-disposed pillow bearing disposed in an interior of the one tubular housing element oriented transversely to the vehicle chassis, and a pinion mounted in the other of the two tubular housing elements, the pinion coordinating with the steering column shaft and engaging the rack, said pinion being rotationally supported by a pair of bearings at respective ends of the other tubular housing element, the two tubular housing elements also having housing means to adapt to and mount a control valve system for power-assisted steering, the two tubular housing elements including respective metallic tubes of different length, bearings and supports for the rack bar and pinion being installed in the two tubular housing elements, the two tubular housing elements being joined in a superposed arrangement by a bead of welding or brazing material disposed at the edges of respective openings in the walls of said two tubular housing elements, the openings being of different dimensions and corresponding different shapes, to form an angular junction of said two tubular housing elements in a superposed orientation corresponding to a desired angular alignment of the steering control linkage, and to provide a communication space between said two tubular housing elements to accommodate engagement of the pinion with the rack when the rack is housed in the longer of said two tubular housing elements and the pinion being housed in the shorter of said two tubular housing elements, and said longer tubular housing element having, at a location intermediate in said longer tubular housing element and close to the superposed openings, a second interior pillow bearing for sliding support of the rack bar, and the shorter tubular housing element having, at a location between the end disposed pillow bearing and the second interior pillow bearing supporting the pinion, means for automatically positioning the pinion in engagement with the rack in response to effects of the axial stresses tending to result in fluctuations in the engagement of the pinion and rack in order to avoid undesirable noise in the steering mechanism, the automatic positioning means including at least one elastic organ which continuously urges the pinion toward the rack.

2. The rack and pinion arrangement according to claim 1, wherein the two tubular housing elements are comprised of steel and are machinable over their entire lengths.

3. The rack and pinion arrangement according to claim 1, wherein the opening in the tubular housing element housing the rack is of larger dimensions than the opening in the tubular housing element housing the pinion, such that an edge of the rack housing element opening supports a border region of the pinion housing element opening so that a zone for application of the bead of weld material or brazing material is provided.

4. The rack and pinion arrangement according to claim 1, wherein the means for automatically positioning the pinion in engagement with the rack in response to fluctuations in the engagement of the pinion and rack to eliminate undesirable noise in the steering mechanism, is comprised of an elastic organ mounted coaxially around a pinion shaft of a conical pinion engaging with the rack, the elastic organ is mounted between an end bearing of the pinion shaft and another bearing supporting the pinion shaft to allow slight axial displacement of said shaft.

5. The rack and pinion arrangement according to claim 4, wherein said elastic organ is comprised of an annular-shaped plate spring disposed coaxially around the pinion shaft of the conical pinion between a base of the pinion and the support bearing for the pinion shaft.

6. The rack and pinion arrangement according to claim 4, wherein said elastic organ is comprised of an annular-shaped plate spring disposed coaxially with the pinion shaft of the conical pinion between a bearing installed on said pinion shaft and a base of a plug piece surrounding said bearing, the plug piece is fixed by screw means to an end of the shorter tubular housing element located opposite to an end where the end support bearing of the pinion shaft is disposed.

7. The rack and pinion arrangement according to claim 1, wherein said means for automatically positioning the pinion in engagement with the rack includes a pair of cylindrically shaped organs comprised of elastic material, disposed radially outwardly of and concentrically with the end bearing and the support bearing of the cylindrical pinion mounted in the interior of the shorter tubular housing element, the organs have internal openings eccentrically disposed in relation to a geometric axis of the organs to selectively urge the pinion shaft toward the rack.

8. The rack and pinion arrangement according to claim 1, wherein said means for automatically positioning the pinion in engagement with the rack are comprised of a pair of generally cylindrically shaped organs comprised of elastic material, disposed radially outwardly of and generally concentrically with an end support bearing of the shaft of a cylindrical pinion, and a support bearing of said pinion shaft mounted in an interior of a plug piece, the plug piece is fixed by screw means to the end of the shorter tubular housing element opposite to the end where said end support bearing of the pinion shaft is disposed and a third elastic organ, comprised of an elastic annular-shaped plate spring urging the bearing mounted coaxially on the pinion shaft, is provided between the base of the plug piece and said bearing fixed to the pinion shaft.

9. The rack and pinion arrangement according to claim 4, wherein said means for automatically positioning the pinion in engagement with the rack are comprised of a pair of said organs comprised of elastic material, disposed radially outwardly of and generally concentrically with an end support bearing of the shaft of a cylindrical pinion, and a support bearing of said pinion shaft mounted in an interior of a plug piece, the plug piece is fixed by screw means to the end of the shorter tubular housing element opposite to the end where said end support bearing of the pinion shaft is disposed and a third elastic organ, comprised of an elastic annular-shaped plate spring urging the bearing mounted coaxially on the pinion shaft, is provided between the base of the plug piece and said bearing fixed to the pinion shaft.

10. The rack and pinion arrangement according to claim 7, wherein said means for automatically positioning the pinion in engagement with the rack are comprised of a pair of said organs comprised of elastic material, disposed radially outwardly of and generally concentrically with an end support bearing of the shaft of a cylindrical pinion, and a support bearing of said pinion shaft mounted in an interior of a plug piece, the plug piece is fixed by screw means to the end of the shorter tubular housing element opposite to the end where said end support bearing of the pinion shaft is disposed and a third elastic organ, comprised of an elastic annular-shaped plate spring urging the bearing mounted coaxially on the pinion shaft, is provided between the base of the plug piece and said bearing fixed to the pinion shaft.

* * * * *